United States Patent [19]

Palmer et al.

[11] 3,884,734
[45] May 20, 1975

[54] PHOSPHORUS-CONTAINING COMPOSITIONS

[75] Inventors: Malcolm George Palmer, Blakedown; Anthony Donald Ball, Coseley, both of England

[73] Assignee: Albright & Wilson Limited, Oldbury, England

[22] Filed: May 3, 1973

[21] Appl. No.: 356,888

[30] Foreign Application Priority Data
May 5, 1972 United Kingdom............... 21061/72

[52] U.S. Cl. .......................... 149/6; 102/6; 149/29
[51] Int. Cl............................................. C06b 19/02
[58] Field of Search .................... 149/29, 30, 31, 6; 117/62.2, 100 B

[56] References Cited
UNITED STATES PATENTS

| | | | |
|---|---|---|---|
| 1,419,295 | 6/1922 | Nichols................................. | 149/30 |
| 2,658,874 | 10/1953 | Clay et al............................. | 149/29 |
| 2,733,217 | 1/1956 | Woyski et al...................... | 149/29 X |
| 3,488,711 | 1/1970 | Dany et al. ........................ | 149/29 X |
| 3,607,472 | 9/1971 | Douda ............................ | 149/29 X |
| 3,733,224 | 5/1973 | Floyd................................ | 142/29 X |

OTHER PUBLICATIONS

Wertheim, Textbook of Organic Chemistry, 3rd Ed., McGraw–Hill Book Co., N.Y., 1951, p. 248.

*Primary Examiner*—Leland A. Sebastian
*Attorney, Agent, or Firm*—Flynn & Frishauf

[57] ABSTRACT

Combustion mixtures consisting essentially of powdered red phosphorus particles coated with a liquid unsaturated organic compound selected from the group consisting of vinyl hydrocarbons, hydrocarbon substituted ethylenes, unsaturated carboxylic acids and esters of unsaturated carboxylic acids, or with a polymeric resin formed by autoxidation of said liquid organic compound; an oxidizing agent selected from the group consisting of metal carbonates, alkali metal sulphates and alkaline earth metal sulphates; and oxalic acid or urea. The combustion mixture is useful as a smoke-generating device.

13 Claims, No Drawings

PHOSPHORUS-CONTAINING COMPOSITIONS

This invention relates to phosphorus-containing compositions.

In particular, the invention relates to compositions comprising red phosphorus and an oxidising agent therefor such as are used in smoke and flame generating devices employed for naval and marine purposes (hereinafter referred to as sea markers).

Red phosphorus is used in pyrotechnics, notably as an ingredient in the combustion mixtures of sea markers and as a flameproofing additive for various types of synthetic resins. These uses often entail the storage in the atmosphere of red phosphorus or of physical mixtures comprising it for varying periods and this can result in an objectionable odour being given off and in metals in contact with the phosphorus becoming corroded, possibly with a consequent safety hazard. In the case of sea markers, for example, decomposition of the combustion mixture can result in internal corrosion with attack on vital components, e.g. if they are present the sea cell and parachute cord.

The foregoing conditions apply still where the phosphorus is 'oiled' that is, intimately mixed with a small quantity of a mineral lubricating oil to reduce its sensitivity to friction.

The present invention provides a means of avoiding or substantially reducing the aforesaid disadvantages whilst not interfering with the utility of the phosphorus in its aforesaid applications.

The invention provides solid particulate compositions comprising powdered red phosphorus the particles of which are coated with a liquid unsaturated organic compound which has autoxidised or will autoxidise in air to form a resin.

Liquid organic compounds for use according to the invention include generally liquid organic compounds containing at least one carbon-carbon double or triple bond which does not form part of an aromatic ring system, which compound is capable of undergoing aerial oxidation with molecular crosslinking. In the novel compositions the liquid organic compound may be present either as such or as the autoxidised resinous form thereof. Such compounds are well known to chemists and may comprise known functional groupings such as alcohol, carboxyl, carbonyl, aldehyde ester and the like. Preferred compounds for present use are hydrocarbons, esters and carboxylic acids. Particularly advantageous results are obtained using hydrocarbons such as those comprising a vinyl grouping e.g. vinyl benzene and vinyl naphthalene and substituted ethylenes, e.g. styrene, allyl benzene allyllnaphthalene and stilbene; unsaturated carboxylic acids such as cinnamic maleic, fumaric, decylenic, stillingic, dodecylenic, palmitoleic, oleic, ricinoleic, petroselinic, vaccenic, linoleic, linolenic, eleosteoric, licanic, parinaric, gadoleic, arachidonic, cetoleic, erucic and nervonic acids, unsaturated esters, e.g. vinyl esters such as vinyl acetate, vinyl propionate and methyl and ethyl esters and glycerol esters of any of the aforesaid unsaturated acids, drying oils and unsaturated glyceride oils generally have been found to have particular utility; such materials include naturally occuring and synthetic oils, e.g. soya bean oil, oiticicia, cottonseed oil, corn oil, tall oil, dehydrated castor oil, tung oil, perilla oil, fish oils, e.g. sardine, herring and menhaden oils and linseed oil. Linseed oil is most preferred. Other drying oils useful according to the invention are disclosed in the book 'Drying Oil Technology' by M. R. Mills published by Pergamon Press (London) 1952 and 'Varnish Constituents' by H. W. Chatfield, published by Leonard Hill Ltd. (London), 2nd edition 1947, the relevant disclosures of which are hereby incorporated by reference herein. Most preferred unsaturated glyceride oils have iodine values of 45 or more.

The liquid organic compounds coat the particles of powdered red phosphorus in the compositions of the invention. This condition is brought about simply by adding the liquid organic compound to the red phosphorus or less preferably to a solid mixture comprising it, as the liquid rather than as an already formed coating on another solid. Compositions are known which comprise red phosphorus intimately admixed with linseed - oil coated magnesium powder (see e.g. the book 'Military and Civilian Pyrotechnics' by Ellern (Chemical Publishing Co. Inc N.Y. (1968) pages 359–60) but such compositions do not have the advantages possessed by those of the invention. Compositions of the invention preferably comprise from 0.5 to 10 percent by weight of liquid organic compound by weight on the phosphorus e.g. 2 to 10 percent preferably from 1 to 8 percent e.g. 2 to 5 percent preferably from 2 to 4 percent.

Compositions as hereinbefore defined consisting essentially of red phosphorus and a liquid organic compound as aforesaid may find use in a variety of applications in which red phosphorus is presently used. For example such compositions may be used in place of red phosphorus alone as additives to synthetic resins according to the disclosures of any of W. German Offenlegungschriften Pat. Nos. 2,128,582; 2,126,923; 2,051,304; 2,050,130; 2,037,510; 2,133,557 and 1,812,521 and Japanese Pat. applications 7,236,864 and 7,206,500 the relevant disclosures of all of which are hereby incorporated by reference herein. Accordingly, the invention further provides a resin composition comprising a major proportion of a resin selected from the groups consisting of polyurethanes, polyvinyl and vinyl halides, polyesters, polyacrylonitriles, polyisocyanurates, epoxy resins, polystyrene resins, polyphenylene ether resins, polyolefines, rubbers and, incorporated into said resin, a minor proportion of a composition as hereinbefore defined consisting essentially of red phosphorus and said liquid organic compound. The novel resin compositions may comprise red phosphorus in like proportions as previous compositions comprising red phosphorus as a flame retardent, e.g. from 0.1 to 5 percent by weight The compositions of the invention have particular value as ingredients of sea marker combustion mixtures, which mixtures constitute a further aspect of the invention.

A sea marker comprises an outer casing defining a smoke exit orifice, a buoyancy means, a combustion mixture within the casing and an ignition means for initiating combustion of the combustion mixture. The ignition means may be electrical, in which case it may typically comprise a sea cell communicating with the sea via a second orifice in said casing and connected across an electrical igniter in contact with the combustion mixture. Alternatively the ignition means may be non-electrical, e.g. a mechanical system such as one comprising a mechanical striker arranged to fire a percussion cap. Other possible ignition means include those employing a metallic phosphide which is wetted on immersion of the sea marker so as to generate spontaneously inflammable phosphine. Sea markers may also comprise other attachments designed for specific purposes such as a parachute to reduce its velocity of descent when it is dropped from an aircraft.

Conventional sea markers comprise a combustion mixture of red phosphorus and an oxidising agent as major ingredients and a minor proportion of oxalic acid (say 1 to 10 by weight of the total). This last is in the normally commercially available form of the dihydrate. The primary function of the oxalic acid is to decompose to form an inert gas blanket over the combustion mixture during combustion so as to maintain sufficient gas pressure within the casing to prevent ingress of water. Oxidising agents include metal carbonates, and alkali metal and alkaline earth metal sulphates. Calcium sulphate is commonly employed. The quantity of oxidising agent used may be in excess of that required to react with all the phosphorus present, the excess varying according to whether longevity or rapidity of smoke and flame generation is primarily desired. In general the ratio of oxidising agent to red phosphorus may range to from 0.5: to 1.5 : 1 parts by weight.

Compositions of the invention useful as combustion mixtures for sea markers may generally comprise conventional oxidising agents for the phosphorus in like proportion to those in previous such compositions. Preferred proportions of red phosphorus to oxidising agent are from 0.5 : 1 to 1.5 : 1 by weight. Preferred oxidising agents are alkali metal and alkaline earth metal sulphates, especially calcium sulphate. Preferably the novel combustion mixtures also comprise a substance which will decompose during combustion of the phosphorus to generate an inert gas i.e. a gas inert to the combustion mixture such as $CO_2$. Such substances include oxalic acid and urea. Preferred proportions of inert gas generator are from 0.5 to 10 percent by weight in the composition, more preferably from 1 to 5 percent by weight, say 2 to 4 percent.

Sea markers comprising a novel combustion mixture as aforesaid constitute a further aspect of the invention.

Before subjecting compositions of the invention to storage in air it may be desirable to 'age' them beforehand to enhance the coating effect of the liquid organic compound. This ageing is brought about by maintaining the composition at an elevated i.e. above ambient temperature in air. Ageing has the effect of accelerating the autoxidation of the liquid organic compound to a dry polymeric resin form and provides a dry free flowing powder of defined composition. Curing times and temperatures needed to bring about this condition may vary with different liquid organic compounds but, as a general guide, ageing may be carried out by heating the composition in air at from 40° to 100°C, e.g. 40° to 80°C, preferably 50° to 70°C per from 4 to 24 hours, the shorter times being used for the higher temperatures.

The invention is illustrated by the following Examples wherein all parts are on a weight basis :

EXAMPLE 1

Powdered red phosphorus was intimately mixed with 5 percent by weight of linseed oil and the mixture was then heated for 24 hrs. at 60°C in an electric oven with free access to the atmosphere.

30g of this material were placed in a glass container fitted with an entry tube for an air stream and an exit tube for air and evolved gases. The glass container was placed in a thermostat bath at 60°C and air at 20° and 66 percent R.H. was passed in at a rate of 125 cc per minute. The evolved gases were passed through absorption bottles containing mercuric chloride solution. As phosphine was evolved from the composition a precipitate was seen to form in the mercuric chloride solution and from time to time was removed and titrated with standardised sodium solution. The quantity of phosphine evolved in a given time was calculated from these titrations.

For comparison 30g of red phosphorus unmixed with any additive were then tested similarly. The total (cumulative) quantities of phosphine which had been evolved in each case after given periods are recorded in Table 1.

TABLE I

| Time Days | Total (cumulative Phosphine evolved from linseed oil/ phosphorus mixture (mgs) | Total (cumulative) Phosphine evolved from phosphorus only (mgs) |
|---|---|---|
| 0 | 0 | 0 |
| 12 |  | 5.74 |
| 20 | 2.04 |  |
| 21 |  | 11.51 |
| 26 |  | 17.59 |
| 36 | 2.70 |  |

It can be seen that the stability of the phosphorus was dramatically improved by the presence of the linseed oil.

EXAMPLE 2

A combustion mixture, composition A, for a sea marker was made up by thoroughly mixing the following ingredients :

| Composition A | Parts |
|---|---|
| Amorphous phosphorus | 43.7 |
| Boiled linseed oil | 2.3 |
| Urea | 3.0 |
| Anhydrous Calcium Sulphate | 51.0 |

For comparison, a second mixture, composition B, was made up similarly from the following ingredients:

| Composition B | Parts |
|---|---|
| Amorphous Phosphorus | 45.425 |
| Hydrocarbon mineral oil conforming to BS 148 (1959) | 0.575 |
| Urea | 3.0 |
| Anhydrous Calcium Sulphate | 51.0 |

30gm samples of these compositions were placed in glass containers and tested for phosphoric evolution by the method of Example 1. Results are shown in Table II.

TABLE II

| Time (days) | Cumulative Total Evolved Phosphine mgs | |
|---|---|---|
| | Composition A | Composition B |
| 0 | 0 | 0 |
| 6 | 0.57 | |
| 7 | | 3.21 |
| 8 | 1.12 | |
| 12 | | 7.42 |
| 18 | | 13.42 |
| 25 | 1.44 | 19.85 |
| 32 | 1.78 | |
| 34 | | 29.17 |
| 36 | | 31.68 |
| 45 | | 38.38 |
| 47 | 2.55 | |

It will be seen that the decomposition giving rise to phosphine evolution was markedly reduced in the case of composition A, incorporating linseed oil. It will be understood that in place of linseed oil as used in the Examples, other liquid organic compounds may be used in identical manner to like effect.

We claim:

1. A solid combustion composition consisting essentially of (i) powdered red phosphorus particles coated with from 0.5 to 10 percent by weight on the phosphorus of a liquid unsaturated organic compound selected from the group consisting of vinyl hydrocarbons, hydrocarbon substituted ethylenes, unsaturated carboxylic acids and esters of unsaturated carboxylic acids or with a polymeric resin formed by autoxidation of said liquid organic compound;

ii. an oxidising agent for the phosphorus selected from the group consisting of metal carbonates, alkali metal sulphates and alkaline earth metal sulphates in a proportion of from 0.5 : 1 to 1.5 : 1 by weight on the phosphorus; and iii. a substance which will decompose during combustion of the phosphorus to give an inert gas, which substance is selected from the group consisting of oxalic acid and urea and is present in a proportion of from 0.5 to 10 percent by weight on the composition.

2. A composition according to claim 1 wherein said liquid organic compound is selected from the group consisting of vinylnaphthalene, styrene, allyl benzene, allylnaphthalene and stilbene.

3. A composition according to claim 1 wherein said organic compound is a drying oil.

4. A composition according to claim 3 wherein said drying oil is selected from the group consisting of soya bean oil, oiticicia, cottonseed oil, corn oil, tall oil, dehydrated castor oil, tung oil, perilla oil, sardine oil, herring oil, menhaden oil and linseed oil.

5. A composition according to claim 1 wherein the particles of red phosphorus are coated with a polymeric resin formed by autoxidation of said organic compound at from 40° to 100°C.

6. A composition according to claim 4 wherein the particles of red phosphorus are coated with a polymeric resin formed by autoxidation of said organic compound at from 40° to 100°C.

7. A composition according to claim 1 wherein the particles of said powdered red phosphorus are coated with a polymeric resin formed by autoxidation of linseed oil.

8. A composition according to claim 7 wherein said resin is present in an amount of from 2 to 5 percent by weight on the phosphorus, calculated as linseed oil.

9. A composition according to claim 5 wherein said autoxidation is at from 40° to 80°C.

10. A composition according to claim 8 wherein said autoxidation is at from 40° to 80°C.

11. A composition according to claim 1 wherein said substance is present in an amount of from 1 to 5 percent by weight on the composition.

12. A composition for use as a combustion mixture which consists essentially of red phosphorus coated with a resin formed by autoxidation of linseed oil at 40° to 100°C in a proportion of from 0.5 to 10 percent by weight as linseed oil on the phosphorus; a proportion from 0.5 : 1 to 1.5 : 1 by weight on the phosphorus of calcium sulphate and from 0.5 to 10 percent by weight on the composition of oxalic acid or urea.

13. A composition according to claim 12 wherein said oxalic acid or urea is present in an amount of from 1 to 5 percent by weight on the composition.

* * * * *